US006083332A

United States Patent [19]

Abrams

[11] Patent Number: 6,083,332

[45] Date of Patent: Jul. 4, 2000

[54] PLUSH TEXTURED MULTICOLORED FLOCK TRANSFER

[75] Inventor: Louis B. Abrams, County of Larimer, Colo.

[73] Assignee: High Voltage Graphics, Inc., Fort Collins, Colo.

[21] Appl. No.: 09/019,576

[22] Filed: Feb. 6, 1998

[51] Int. Cl.[7] .............................. A46D 1/00; B44C 1/165; B32B 31/00; B05D 1/14; B05D 1/16

[52] U.S. Cl. .............................. 156/72; 156/230; 156/239; 156/240; 156/241; 156/247; 156/276; 427/200; 427/206; 427/458; 427/462; 427/472; 428/90

[58] Field of Search .............................. 156/62.2, 63, 72, 156/150, 151, 230, 231, 235, 237, 238, 239, 240, 241, 247, 277, 276; 427/196, 200, 207, 206, 457, 458, 462, 463, 464, 465, 472, 473, 474; 428/90

[56] References Cited

U.S. PATENT DOCUMENTS

| | | | |
|---|---|---|---|
| 3,793,050 | 2/1974 | Mumpower, Jr. | 117/17.5 |
| 4,292,100 | 9/1981 | Higashiguchi | 156/72 |
| 4,396,662 | 8/1983 | Higashiguchi | 428/90 |
| 5,047,103 | 9/1991 | Abrams et al. | 156/72 |
| 5,900,096 | 5/1999 | Zemel | 156/233 |

*Primary Examiner*—Richard Crispino
*Assistant Examiner*—J. A. Lorengo
*Attorney, Agent, or Firm*—Paul M. Denk

[57] ABSTRACT

Plush textured multicolored flock transfers are obtained which have the appearance of a direct flocked article and the manufacturing and application advantages of a flock transfer. The method of manufacture includes applying sequentially to an adhesive coated base sheet different colored flocks which can be greater than 0.5 mm long through predetermined areas of masked screens.

4 Claims, 1 Drawing Sheet

PLUSH TEXTURED MULTICOLORED FLOCK TRANSFER

BACKGROUND OF THE INVENTION

I. Field of the Invention

The invention generally relates to a method of manufacturing flock transfers. Specifically, the invention is directed to multicolor flock transfers which exhibit an enhanced texture.

II. Description of the Prior Art

There are two basic methods of applying a multicolor flock design to a surface. The first method is referred to an a multicolor direct flocking. The flock is applied directly to the surface that forms the finished product. Usually wallpaper, carpets and decorative elements of garments are produced in this manner.

An example of direct flocking is found in U.S. Pat. No. 3,793,050, to Mumpower. This particular direct flocking method is unique in that it allows the use of different color and size of flock in the same design surface to be flocked. The adhesive is rendered tacky and each color of flock is passed through a screen that restricts that color to the desired part of the adhesive layer. A multicolor flock design is thus obtained on the surface.

Multicolor direct flocking suffers a number of disadvantages. It is an exacting procedure with many variables to be controlled requiring specialized flocking equipment and an environment that is controlled for relative humidity. During the startup of such a procedure many reject-quality articles may result as the variables are adjusted by trial and error, and the desired result is found. The procedure is relatively slow since usually only one article at a time may be decorated. Further, if the article to be decorated has an uneven surface like many textiles, then density of the flock, control, speed and the quality of the finished design i.e., sharpness of lines separating colors, vivid images, etc., would be adversely affected. Thus, direct flocking has been limited in use in the world.

Flock transfers are a second method of employing flock fibers in a decorative manner. Examples of these transfers are illustrated in U.S. Pat. Nos. 4,292,100 and 4,396,662, both to Higashiguchi and UK Patent applications No. 2,065,031 to Maitland, and No. 2,126,951 to Transworth. Transfers are formed by applying flock to a release sheet having a temporary release adhesive coating. The flock is then dyed with different color inks and coated with a binding layer and hot melt adhesive in a desired decorative design. The transfers are applied to articles with heat and pressure. The release sheet is peeled away leaving a finished decorative design.

Conventional multicolor flock transfers have not achieved significant commercial success in the United States due to a number of inherent limitations. The basic underlying problem is that a richly textured appearance has not been achieved using flock to justify the additional cost for conventional screen printing. The flock transfers are relatively flat and thus a plush textured multicolored look is not achieved. From experience, original flock transfers are far less permanent in their application, and mainly consist of rayon fibers colored with pigment inks, versus the new style of fibers that may be more wash-and color-fast yarn-dyed or spun-dyed nylon or polyester type of fibers. Also, unlike original flock transfers, this current invention has colors which are far more brilliant which is a function of the light being transmitted through the more translucent plastic (nylon or polyester) and longer fibers, reflected off of the backing adhesive and transmitted back though the fibers resulting in a much more intense color for observance when the transfers are applied and viewed by any nearby observer.

A fundamental limitation of the flock transfer manufacturing method is the problem of penetrating the flock fiber with printing ink to form the desired design. Typical flocks used in flock transfers are only 0.3 mm long. This is unlike direct flocking which can use colored flocks of approximately 1 mm to 3 mm in length.

An objective of the present invention is to produce a plush textured flock transfer which presents a plush textured three dimensional appearance. A second objective is to provide a means of producing plush-textured multicolored flock transfers which can be manufactured in batches containing more than one transfer per batch. This invention also includes a specially-pattern to release adhesive pattern that has bleed-off lines which carry the high voltage current used for the electrostatic fiber coating, to the ground, and therefore, helps to enhance the counter potential effect or power of the electrostatic field applied during the flocking process. A third objective of the invention is to provide a method of decorating articles with a multicolor plush textured design which overcomes the disadvantages and limitations of direct flocking. Finally, an objective of the invention is to allow manufacturers of products to economically make use of plushly-textured flock designs in place of screen printed designs. In one embodiment for this invention, the fibers arranged in proximity with the outside edges of the transfer feature a diminishing density to prevent impression lines in the substrate material to which the transfer is being applied; and that insert materials can be incorporated into the transfer for a mixed-media effect, as distinct from the current type of plush transfers available upon the market.

SUMMARY OF THE INVENTION

A method of making a multicolored flock transfer which comprises the printing of a release adhesive upon a base sheet on a predetermined design. Each different color flock is then sequentially flocked into its designated part of the adhesive design, separated from each other by screens. As previously stated, the outer edges of the applied transfer as flocked in place may have that diminishing density so as to furnish a fadeout appearance to the transfer after its application. The free end of the flock fibers are coated with a binding adhesive upon which a hot melt adhesive is applied.

DESCRIPTION OF THE PREFERRED EMBODIMENT

Figure 1:
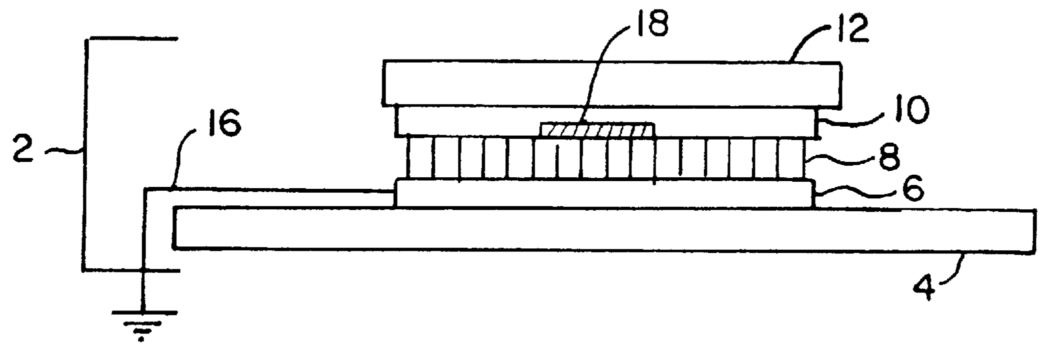
FIG. 1 is a cross-sectional view of the flock transfer of the invention.

As shown in FIG. 1 the transfer 2 of the present invention comprises a dimensionally stable paper or film sheet 4 to which a conventional flock transfer release adhesive 6, usually silicone wax, is applied in the reverse of a desired pattern. That is a pattern which corresponds to the overall image which is to be flocked. As previously explained, the invention includes the specially-patterned release adhesive that has bleed-off lines that carry the high voltage current used for the electrostatic fiber coating, to the ground. The flock 8 which may be rayon or any other type of conductive material such as nylon, polyester, etc. is applied to the activated adhesive 6 by conventional electrostatic means or gravity, or vibration or any combination of these means for application of the conductive fibers.

In order to achieve a multicolor effect the flock 8 is applied through a gauze-like mesh screen. The different colors are achieved by using different color flock. As each color is applied a different screen is used which only allows penetration of the particular colored flock onto its section of the release adhesive 6. Since the flock is not printed with ink following flocking as in a conventional multicolor transfer, the length of the flock can be substantially increased to 1 mm as opposed to the conventional 0.3 mm. Thus, the transfer is much more plush, vivid and three dimensional.

The flock 8 is coated with a binder adhesive 10 such as a water based acrylic 1 which binds the flock into a unit. The binder 10 may contain an additional adhesive, a hot melt, for binding the transfer to a substrate. In the alternative the hot melt adhesive 12, usually a granular polyester or nylon, may form a separate layer. The use of separate hot melt layers is preferable.

Figure 2:
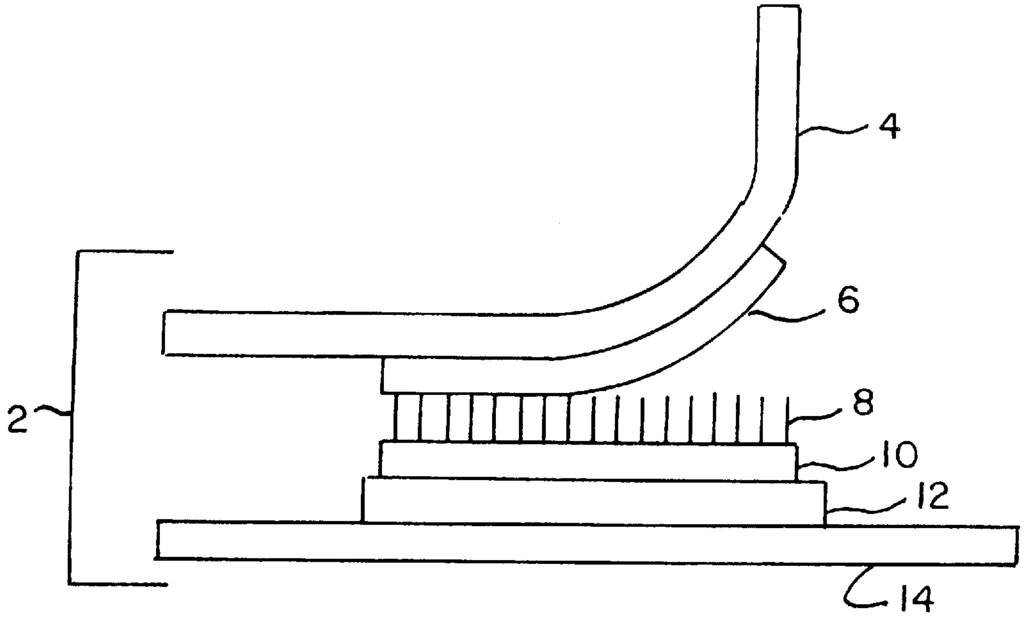
FIG. 2 is a cross-sectional view of the flock transfer of the invention being applied to a surface.

FIG. 2 illustrates the application of the transfer to a textile 14 or other surface. Other type of insert materials may be used in conjunction with the flocked transfer to provide a different appearance to the flock, such as a reflective means used in conjunction with the flocked transfer, to enhance its appearance, and provide a variable type of appearing transfer. The hot melt surface 12 is placed against the textile 14. Heat and pressure is applied to the release sheet 4 in order to bond the transfer to the garment. The release sheet 4 with the adhesive 6 is then pulled away from the flock 8. This leaves a transfer permanently affixed to the garment.

The present invention utilizes the general materials and flocking techniques found in U.S. Pat. Nos. 3,793,050; 4,292,100; and 4,396,662 and UK Patent applications 2,065,031 and 2,126,951 all of which are incorporated by reference herein. Although the invention utilizes conventional materials and techniques which can be generally found in various prior art references, the particular combination of elements of the present invention produces a unique and superior flock transfer.

An example of the method of producing the flock transfers of the invention comprises:

1) A silicone wax layer 6 in the reverse of a predetermined pattern is applied to a dimensionally stable base sheet 4, such as, a bond paper or film.
2) A first color of (rayon) flock 8 is passed through a monofiliment polyester screen for ten to fifteen seconds through an electrostatic field. The screen has open sections in those areas which correspond to the first colored section of the reversed design. The flock 8 is imbedded in the wax layer 6 since the wax acts as a ground for the charged particles. This adhesive pattern has and produces that bleed-off effect through bleed line 16 that functions as a conduit for the high voltage current used for the electrostatic fiber coating, conducting it to the ground, therefore helping to enhance the counter potential effect or power of the electrostatic field used and encountered during the preparation of a flock transfer.
3) This procedure is then followed for each succeeding color of rayon flock 8 that is to be electrostatically flocked in order to form the desired design. The unit is then dried. At this time, other insert materials, such as 18 may be applied to the transfer, such as more reflective type of materials, in order to enhance the diverse appearance for the flocked transfer, when applied.
4) The tips of the exposed flock 8 is printed using conventional screen printing equipment with a water based acrylic binder 10 (40%–60% water). The binder 10 binds the flock 8 and further provides opacity and brilliance by reflecting light.
5) The binder 10 is powdered with a nylon polyester hot melt adhesive 12. The transfer is then dryed overnight. Or, the transfer may be dried in a batch oven dryer.
6) After brushing and vacuuming excess adhesive 12 the transfer is placed in a curing oven to cross-link the binder 10.
7) To apply the transfer to a textile 14, the adhesive surface 12 is positioned on the textile 12. Heat and pressure (5–60 seconds at 300–350 degrees F) is applied to the base sheet 4. The transfer is allowed to cool and the paper 4 and wax 6 are removed by peeling the paper 4 from the flock 8. The desired flock design is thus permanently affixed to the textile.

What is claimed is:

1. A method of making a multi-color flock transfer comprising:

a.) printing a release adhesive upon a base sheet wherein said adhesive is in a particular design;

b.) flocking with different colored flocks into said adhesive by masking a different section of said adhesive as each color is sequentially flocked wherein the outer edges of the flock are less dense fibers to provide a diminishing density to the appearance of the flocked transfer when applied to a material;

c.) applying a binding adhesive to the free end of said fibers;

d.) adding an insert reflective material to one of the different colored flocks and between said flock and the base sheet to provide a multi-appearing transfer; and e.) applying a binder adhesive to the free end of the flocked fibers, in preparation for heat application of said multi-colored flock and insert material transfer to a surface.

2. A method of making a multi-color flock transfer comprising:

e.) printing a release adhesive upon a base sheet wherein said adhesive is in a particular design and said adhesive incorporates bleed-off lines which ground the charge from the coated electrostatic fiber during the flocking process;

f.) flocking with different colored flocks into said adhesive by masking a different section of said adhesive as each color is sequentially flocked;

g.) applying a binding adhesive to the free end of said fibers;

h.) adding an insert reflective material to one of the different colored flocks and between said flock and the base sheet to provide a multi-appearing transfer; and e.) applying a binder adhesive to the free end of the flocked fibers, in preparation for heat application of said multi-colored flock and insert material transfer to a surface.

3. The method of claim 2 wherein said flocked fibers are about 1 mm in length.

4. The method of claim 2 wherein said surface is a textile material, and heat and pressure are applied to said transfer to permanently affix said transfer to said textile material.

* * * * *